Sept. 7, 1948.                I. E. FAIR                 2,448,581
                TESTING CIRCUITS FOR PIEZOELECTRIC CRYSTALS
Filed Jan. 27, 1945                                3 Sheets-Sheet 1

INVENTOR
*I. E. FAIR*
BY
*Walter M. Hill*
ATTORNEY

Sept. 7, 1948.　　　　　　　　I. E. FAIR　　　　　　　　2,448,581
TESTING CIRCUITS FOR PIEZOELECTRIC CRYSTALS
Filed Jan. 27, 1945　　　　　　　　　　　　　　　　3 Sheets-Sheet 2
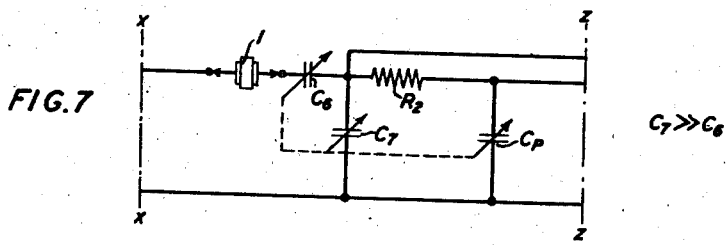
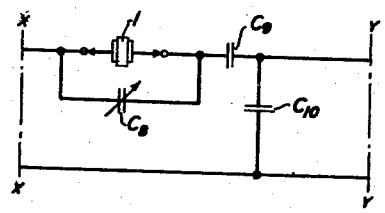
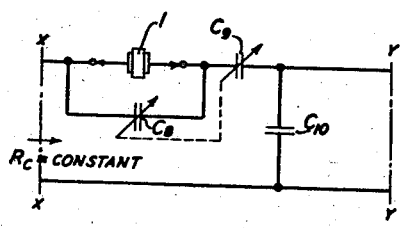
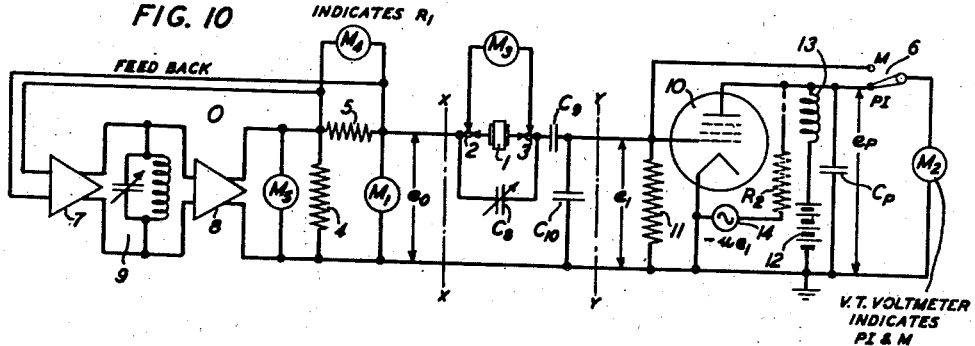
INVENTOR
*I. E. FAIR*
BY
*Walter M. Hill*
ATTORNEY Sept. 7, 1948.  I. E. FAIR  2,448,581
TESTING CIRCUITS FOR PIEZOELECTRIC CRYSTALS
Filed Jan. 27, 1945  3 Sheets-Sheet 3

INVENTOR
I. E. FAIR
BY
Walter M. Hill
ATTORNEY

Patented Sept. 7, 1948

2,448,581

UNITED STATES PATENT OFFICE 2,448,581

TESTING CIRCUITS FOR PIEZOELECTRIC CRYSTALS

Irvin E. Fair, Basking Ridge, N. J., assignor to Bell Telephone Laboratories, Incorporated, New York, N. Y., a corporation of New York Application January 27, 1945, Serial No. 574,953

21 Claims. (Cl. 175—183)

This invention relates to electrical testing and more particularly to a test circuit for testing piezoelectric crystals to determine certain quality factors thereof which are important to the performance of the crystals when connected in an oscillator network.

In the testing of electrical devices or networks it is often desirable to express their over-all performance with respect to certain desirable characteristics in terms of a single quality factor which may include a number of the important fundamental parameters of the electrical device or network. Single factors of this type are often referred to as "figure of merit," "Q," etc. In connection with piezoelectric crystals to which this invention is directed the mathematical definition of the quality factors as well as the measurements thereof have been rather unsatisfactory. The usual routine measurements on piezoelectric crystals comprises a measurement of the resonant and antiresonant frequencies of the crystal and a measurement of its "activity." This latter measurement comprises essentially measuring the alternating current in the grid circuit of an oscillator in which the crystal forms a frequency determining element.

While these measurements have been helpful they have not been entirely satisfactory. One of the reasons for the unsatisfactory results obtained is that while these measurements tend to indicate the relative quality of the crystal they are not independent of the circuit in which they are used. Stated otherwise, they do not take into account all of the important fundamental parameters of the crystal and the circuit in which the crystal is tested and consequently they mean nothing except in connection with the particular circuit in which the test is made. For example, it is desirable that a quality factor measurement made upon a particular crystal should give information which would enable a designer to predict the operation of this crystal in any oscillator in which the crystal may be used rather than just the particular circuit in which it was tested. The design implications involved and the advantages thereof are manifestly obvious to any one skilled in the art.

It is proposed that in connection with the use of piezoelectric crystals in oscillators two quality factors be employed. The first of these may be defined mathematically as follows:

$$M = \frac{X_{C_0}}{R_1} = \frac{1}{\omega C_0 R_1} \quad (1)$$

where:
M="Figure of merit."
$X_{C_0}$=Reactance of inherent shunt capacitance of crystal at the test frequency.
$C_0$=Inherent shunt or static capacitance of crystal.
$R_1$=Inherent internal series path resistance of crystal.
$\omega$=Test frequency multiplied by $2\pi$.

As indicated by Equation 1 the "figure of merit" is arbitrarily defined as the ratio of the shunt capacity reactance of the crystal at the operating or test frequency to the inherent internal series path resistance of the crystal.

The other quality factor may be called the "performance index" and may be defined mathematically as follows:

$$PI = \frac{X_{L_C} X_{C_2}}{R_C}$$

which is substantially equal to $$PI = \frac{X_{L_C}^2}{R_C} \quad (2)$$

and also substantially equal to $$PI = \frac{M}{\omega C_0 \left(1 + \frac{C_2}{C_0}\right)} = \frac{1}{\omega^2 C_0^2 R_1 \left(1 + \frac{C_2}{C_0}\right)^2}$$

where:
PI="Performance index."
$X_{L_C}$=Equivalent inductive reactance of crystal at test frequency.
$R_C$=Equivalent resistance of crystal at test frequency.
$C_2$=External capacitance connected across crystal terminals.
$X_{C_2}$=Reactance of capacitor $C_2$ at test frequency.
$M$, $\omega$, $C_0$, $R_1$ as defined in Equation 1.

In the above expression the "performance index" is arbitrarily defined as the ratio of the product of the equivalent inductive reactance of the crystal times the reactance of the external capacitance to the equivalent resistance of the crystal at the test frequency. Since the crystal reactance is a function of frequency it is important that the test frequency be very accurately and precisely controlled in order to properly measure the performance index. It will be apparent that these quality factors as thus defined take into account several important fundamental parameters of the crystal and as will be shown later these factors are particularly useful not only to indicate the crystal quality, but also as design data.

It is the object of this invention to provide a circuit means for quickly and accurately measuring these crystal quality factors.

It is a further object of this invention to provide a circuit means for testing crystal quality factors wherein the test frequency is accurately controlled by the crystal under test.

A still further object is to provide a self-calibrating means whereby measurements of the performance index may be made in terms of fundamental circuit parameters of known kind and magnitude.

The foregoing objects are attained by this invention by providing in combination with the crystal to be tested a source of alternating current the frequency whereof is maintained equal to a predetermined operating frequency of the crystal under test, a capacity means for coupling the crystal to the source for driving the crystal, a series circuit comprising a resistance means and a second capacity means coupled to the driving circuit so as to have impressed thereon a voltage substantially proportional to the voltage appearing across the crystal and a voltage measuring means adapted for connection to either the driving circuit whereby one quality factor is measured or across the second capacity means whereby a different quality factor is measured.

The invention may be better understood by referring to the accompanying drawings in which:

Fig. 1A discloses the equivalent electrical network of a piezoelectric crystal;

Fig. 1B discloses the equivalent electrical network of the same crystal oscillating at a frequency between its resonant and antiresonant frequencies in an oscillator circuit;

Figure 11:
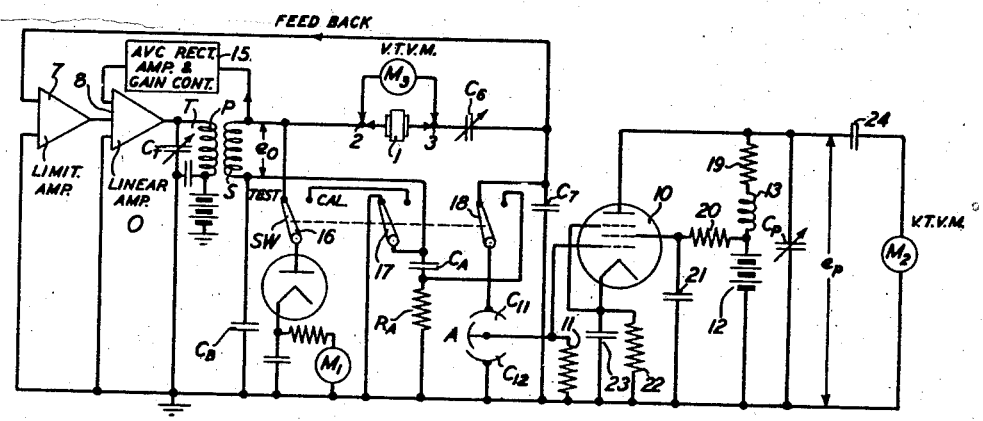
Figure 12:
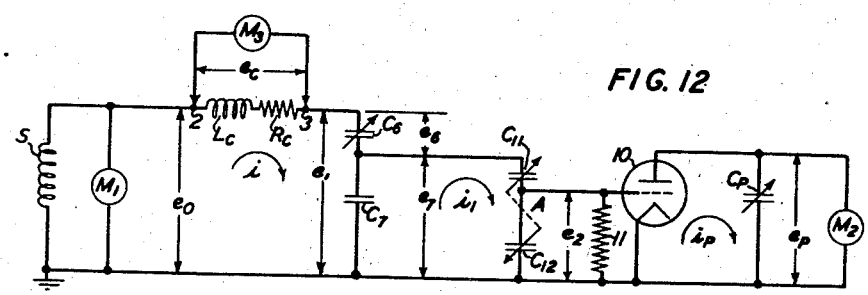
Figure 13:
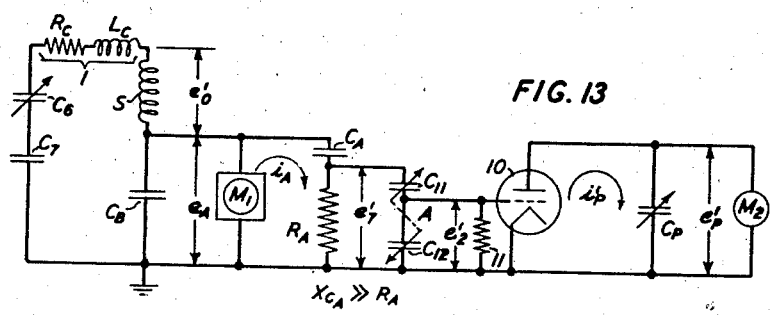

Figs. 5, 6, 7, 8 and 9 disclose various capacity coupling means for coupling the crystal under test to the alternating current source;

Fig. 10 discloses a practical embodiment of the invention in a circuit for measuring both the figure of merit and the performance index;

Fig. 11 discloses a slightly different circuit arrangement embodying the same invention as disclosed in Fig. 10 for measuring the performance index and showing also the additional feature of a self-calibrating means;

Fig. 12 discloses the circuit of Fig. 11 employed for the measurement of the performance index of a piezoelectric crystal; and Fig. 13 shows the circuit of Fig. 11 set up for calibrating the test circuit.

Figure 1:
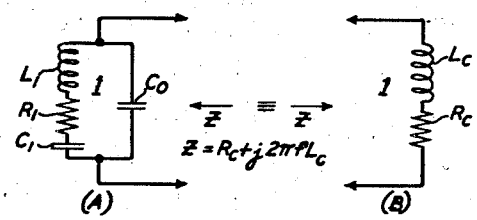

Referring now to Fig. 1A the network 1 represents the equivalent electrical network of a piezoelectric crystal. This is a conventional representation of the electrical parameters of a crystal and requires no lengthy discussion. It should be noted that the network comprises a shunt capacitance $C_0$ connected in parallel with a series circuit comprising an inductance $L_1$, resistance $R_1$ and capacitance $C_1$. It has been established that when a crystal is connected in an oscillator circuit it resonates somewhere between its resonant and antiresonant frequencies, these frequencies actually being rather close together. Moreover, it has also been established that the impedance of a crystal operating within this frequency range appears as a positive impedance or more specifically, it appears as an inductive reactance in series with a resistance. This is shown in Fig. 1B in which the crystal network 1 is shown comprising a series circuit of inductance $L_c$ and resistance $R_c$. This inductance and resistance are the equivalent inductance and equivalent resistance of the crystal when connected to the oscillator circuit and oscillating within the range above specified. Under these conditions the crystal impedance may be expressed in the well-known complex form as follows:

$$Z = R_c + j2\pi f L_c \quad (3)$$

where
$f$ = oscillator or test frequency.

Figure 2:
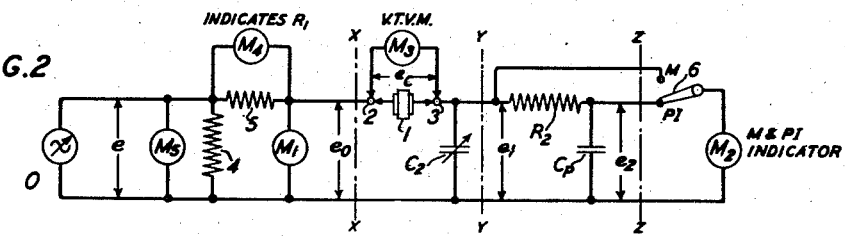
Fig. 2 is a circuit illustrating the principles of the invention.

The circuit of Fig. 2 shows the elementary principles of the invention and provides means for measuring either the figure of merit M or the performance index PI. The crystal 1 is connected to the test terminals 2, 3. A source of alternating current O having an output voltage $e$ measured by meter $M_5$ is connected to a resistor 4. The crystal is connected in parallel with resistor 4 through resistor 5 and capacitor $C_2$. The resistance of resistors 4 and 5 should be small compared with the reactance of capacitor $C_2$ and it is preferable that the two resistances be equal. If desired a meter $M_4$ may be connected across the resistor 5 and the frequency of the alternating current source O independently adjusted to the resonance point of the crystal. At this resonance point the indication of meter $M_4$ will be proportional to the resistance $R_1$ of the crystal. In the use of the apparatus the frequency of the alternating current source O must be carefully adjusted until the meter $M_4$ shows a maximum deflection indicating the resonance point of the crystal. Knowing the constants of the circuit the meter $M_4$ may be calibrated to read the resistance $R_1$ directly.

For the purpose of making the figure of merit M and the performance index PI measurements the voltage $e_0$ must be carefully stabilized so that once adjusted to a predetermined value it will remain constant. This may be indicated by a meter $M_1$ connected as shown in Fig. 2. The figure of merit reading is made by operating switch 6 to its upper position labeled M. In this position vacuum tube voltmeter $M_2$ is connected directly across the coupling capacitance $C_2$ thereby reading a voltage $e_1$. The exact nature of this measurement will be more fully explained later. With the switch 6 moved to its lower position the performance index may be measured. In this position it will be noted that the meter $M_2$ is connected directly across capacitor $C_p$. This capacitor is connected across capacitor $C_2$ through a relatively high resistance $R_2$. The resistance of resistor $R_2$ should be large compared with either the reactance of capacitor $C_p$ or of capacitor $C_2$ at the test frequency. The voltage drop $e_2$ appearing across capacitor $C_p$ is measured by vacuum tube voltmeter $M_2$ this reading being proportional to the performance index of the crystal under test.

A portable vacuum tube voltmeter $M_3$ is shown temporarily connected to the test terminals 2, 3. This portable meter is used first to measure the crystal voltage $e_c$ when the crystal is operating in an oscillator of known design for which it is desired to make crystal measurements and prepare specifications. The meter $M_3$ and the crystal are then transferred to the test set terminals 2, 3. When the voltage $e_c$ across the crystal is adjusted in the test set to equal the voltage which appeared across this crystal in the oscillator of the design in which the crystals are to be used, the vacuum tube voltmeter $M_3$ is removed from the crystal. As this is a high impedance input meter it will have little or no effect on the voltage appearing across the crystal by reason of its removal from the circuit. It should, however, be removed before making any measurements on the crystal itself.

Figure 3:
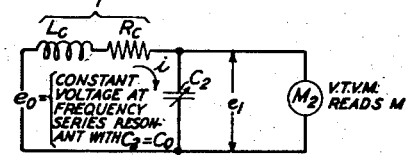
Figs. 3 and 4 illustrate respectively the circuits for measuring the figure of merit and the performance index.

The manner in which the circuit of Fig. 2 may be used for measuring the figure of merit M and the performance index PI will be more fully discussed in connection with Figs. 3 and 4. In Fig. 3 the essential parts of the circuit of Fig. 2 are shown to illustrate the use of the apparatus for making measurements of the figure of merit M. Prior to setting up the apparatus for making this measurement it is necessary to know the inherent shunt capacitance of the crystal $C_0$. This capacity measurement is made by conventional means which need not be described in this specification. It is sufficient to say that the measurement is made on a low frequency bridge at a frequency where the only reactance appearing across the crystal is essentially the reactance of the inherent shunt capacitance. It is also necessary to know the voltage at which the crystal is expected to operate in the particular oscillator design in which it is to be used. As previously stated a convenient way of obtaining this latter information is to connect a suitable crystal in an oscillator of the proposed design and make the measurement of its voltage with the vacuum tube voltmeter $M_3$. Therefore the procedure to be followed in setting up the circuit of Fig. 2 for measuring the figure of merit $M$ is first to measure the inherent shunt capacitance $C_0$ of the crystal. Then the capacitance of capacitor $C_2$ should preferably be adjusted to equal the inherent shunt capacitance $C_0$ of the crystal. Switch 6 should be operated to the position M. The frequency of the alternating current source O must then be adjusted until meter $M_2$ indicates a maximum deflection. Voltage $e_0$ as read by meter $M_1$ should be adjusted until the voltage $e_c$ across the crystal is equal to some predetermined value which may preferably be the operating voltage in the oscillator of the proposed design. Meter $M_3$ must be removed from the circuit before making crystal measurements. The maximum deflection of meter $M_2$ is a direct measure of the figure of merit $M$. That this is so can be shown mathematically by referring to Fig. 3.

In Fig. 3 it will be noted that the crystal I is represented in its equivalent form as shown in Fig. 1B above and is connected in series with the capacitor $C_2$ and the voltage source $e_0$. With the capacitor $C_2$ set equal to the capacitance $C_0$ of the crystal, voltage $e_0$ will produce a current $i$ in this series circuit. This current is of magnitude defined by the following expression.

$$i = \frac{e_0}{R_C + j(X_{L_C} - X_{C_2})} \quad (4)$$

where $i$ and $e_0$ = current and voltage as shown in Fig. 3. $X_{C_2}$, $R_C$, $X_{L_C}$ are as defined in Equation 2.

The voltage across capacitor $C_2$ is shown in Fig. 3 as $e_1$. This will occur when the current through the capacitor $C_2$ is at its maximum value and consequently the vacuum tube voltmeter $M_2$ will read its maximum deflection. This maximum current will occur when the inductive reactance $X_{L_C}$ is essentially equal to the capacity reactance $X_{C_2}$, in Equation 4. Therefore the maximum current value may be expressed as follows:

$$i_{max} = \frac{e_0}{R_C} \quad (5)$$

The meter $M_2$ will read the voltage $e_1$ which is the reactance drop across capacitor $C_2$ and this may be expressed as follows:

$$e_1 = X_{C_2} i_{max} = \frac{X_{C_2} e_0}{R_C} \quad (6)$$

The value of the equivalent resistance of the crystal $R_C$ may be expressed in terms of the inherent resistance of the crystal $R_1$, the inherent shunt capacitance of the crystal $C_0$ the capacitance $C_2$ of the test circuit. This relationship may be shown to be approximately $$R_C = R_1\left(1 + \frac{C_0}{C_2}\right)^2 \quad (7)$$

Substituting this expression in Equation 6 will yield $$\frac{e_1}{e_0} = \frac{X_{C_2}}{R_1\left(1 + \frac{C_0}{C_2}\right)^2} \quad (8)$$

Now under the conditions of the test, the capacitance of capacitor $C_2$ is preferably made equal to the inherent shunt capacitance of the crystal $C_0$. Consequently, not only the capacitances but also their reactances are equal. Making these substitutions in Equation 8 will yield the following expression:

$$\frac{e_1}{e_0} = \frac{X_{C_0}}{4R_1} \quad (9)$$

Comparing Equation 9 with Equation 1 where the figure of merit is defined, it will be found that $$M = 4\left(\frac{e_1}{e_0}\right) \quad (10)$$

It will be evident that for any particular oscillator design if the value of the voltage $e_0$ is kept constant the figure of merit is measured directly by the indication of meter $M_2$ which measures the voltage $e_1$. Thus it will be seen that by operating the apparatus as specified above, the figure of merit may be directly indicated by the reading of meter $M_2$.

While it is preferable and convenient to make capacitance $C_2$ equal to the capacitance $C_0$ as specified above, this capacitance may, alternatively, be adjusted to any known value, whereby the constant by which the voltage ratio $e_1/e_0$ must be multiplied will be other than the constant 4 appearing in Equation 10. With both $C_0$ and $C_2$ known, this constant will be equal to $$2 + C_2/C_0 + C_0/C_2$$

Figure 4:
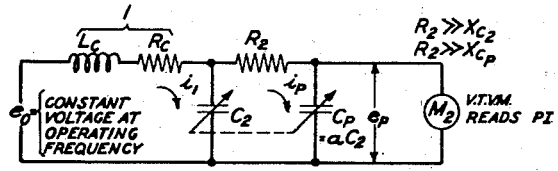

That the vacuum tube voltmeter $M_2$ may also be used for indicating directly the value of the performance index can be shown by a similar analysis which will be described in connection with Fig. 4. To make this measurement capacitance $C_2$ should be made equal to that presented to the crystal by the oscillator of the particular design in which the crystal is to be used. It is therefore necessary to know the capacitance to be presented by the oscillator circuit and also the voltage to appear across the crystal in the oscillator circuit. The apparatus is then set up as follows:

Referring to both Figs. 2 and 4, the capacitance of capacitor $C_2$ is adjusted to equal the capacitance presented by the oscillator in which the crystals are to be used. The switch 6 is moved to its lower position so that the meter $M_2$ is connected across the capacitor $C_p$. The frequency of the driving source O should then be carefully adjusted until a maximum deflection of meter $M_2$ is observed. The voltage $e_0$ read by meter $M_1$ should be adjusted until the voltage across crystal as read by meter $M_3$ is the same as it was in the oscillator as previously described in connection with the measurement of the figure of merit. The portable vacuum tube voltmeter $M_3$ must then be removed from the circuit. Any number of other crystals may be successively inserted between test terminals 2 and 3 and the meter M₂ will indicate proportional to their performance index. That this is so may be shown by referring to Fig. 4.

It will be noted that Fig. 4 is similar to Fig. 3 except that resistor R₂ and capacitor Cp has been connected across capacitor C₂ and the meter M₂ reads the voltage $e_p$ across the capacitor Cp. Neglecting the relatively small current $i_p$, the current $i_1$ is substantially equal to the current obtained by Equation 4. The maximum current in this mesh of the network may also be expressed by Equation 5. The resistance of resistor R₂ is very large compared with either the reactance of capacitor C₂ or the reactance of capacitor Cp. Keeping these facts in mind together with the fact that the voltage $e_p$ is equal to the product of the current $i_p$ times the reactance of the capacitor Cp, the voltage $e_p$ may be expressed $$e_p = \frac{X_{C_p} X_{C_2} e_0}{R_2 R_C} \tag{11}$$

where $X_{C_p}$ = reactance of capacitor Cp.
$X_{C_2}$ = is as defined in Equation 4.
$e_p$, $e_0$, R₂ and R_C are as shown in Fig. 4.

To provide further simplification, the capacitors Cp and C₂ may be ganged together as indicated in Fig. 4. With the relationship shown in Fig. 4, it is evident that $$X_{C_p} = \frac{X_{C_2}}{a} \tag{12}$$

where $a$ = design constant.

Substituting the expression above in Equation 11 will yield $$e_p = \frac{e_0}{aR_2} \cdot \frac{X_C^2}{R_C} = \frac{e_0}{aR_2} \cdot \frac{X_{L_C}^2}{R_C} \tag{13}$$

Comparing this equation with Equation 2 it will be obvious that the performance index may be expressed as a constant K times the reading $e_p$ of the vacuum tube voltmeter M₂, as indicated by the following equation $$PI = \frac{aR_2}{e_0} \cdot e_p = K e_p \tag{14}$$

It will thus be apparent that with the apparatus operated as described above, the instrument will measure not only the figure of merit M but will also read proportional to the performance index PI.

Figure 5:
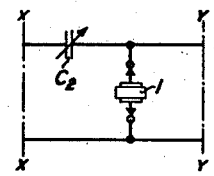

Figs. 5, 6, 7, 8 and 9 show various capacity coupling means for coupling the crystal to the source of alternating current. Fig. 5, for example, may replace the portion of Fig. 2 included between the lines X—X and Y—Y. The vacuum tube voltmeter M₂ has been dele'ed from this figure as well as in Figs. 6 to 9, inclusive, but is actually in the same manner as previously described. The only difference between Figs. 2 and 5 is that the crystal 1 and the variable capacitor C₂ have been interchanged. This may be done when it is understood that the voltage appearing across the crystal at resonance is substantially equal to the voltage appearing across this capacitor. Just as in Fig. 4, the variable capacitor C₂ may be ganged with the variable capacitor Cp.

Figure 6:
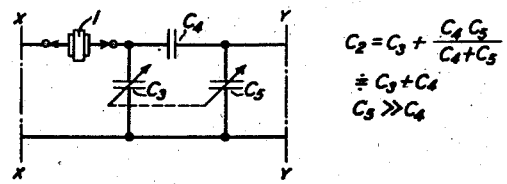

In Fig. 6, the portions of Fig. 2 included between the lines X—X and Y—Y is shown to comprise the crystal in the series branch with a network of capacitors C₃, C₄ and C₅, which comprise a capacitance network equivalent to the capacitance C₂. It is convenient in the design to make the value of the capacitance C₅ large compared with the capacitance of C₄ so that the sum of the capacitances C₃ and C₄ is substantially equal to the capacitance C₂. Capacitors C₃ and C₅ are preferably ganged together to prevent changes in calibration when making the adjustment of this network.

Figs. 7, 8, and 9 disclose still further modifications of the coupling capacitor arrangement which may be inserted in Fig. 2 between the lines X—X and Z—Z. These circuits have the advantage that sufficient decoupling exists between the crystal driving circuit and the measuring circuit so that the loss introduced by the measuring circuit is negligible. In Fig. 7 this decoupling is accomplished by making the capacitance of C₇ large compared with the capacitance of C₆. The use of this network is somewhat simplified by ganging C₆, C₇, and Cp to maintain the calibration fixed when C₆ is varied.

Figs. 8 and 9 show two substantially identical capacitance network arrangements for coupling the crystal to the alternating current source which may be inserted in Fig. 2 between the lines X—X and Y—Y. The advantage of ganging capacitors C₈ and C₉ together in Fig. 9 is to maintain constant the equivalent crystal resistance.

It should be kept in mind that in all of the capacity coupling schemes shown in Figs. 5 to 9, inclusive, the crystal driving circuit including the crystal is a resonant circuit and that the source is preferably of low impedance. Also, these circuits are merely some alternative ways of coupling the measuring circuit to the crystal and the crystal to the source of alternating current. Each has its own peculiar advantages as briefly outlined above.

To obtain accurate readings with the apparatus shown in Fig. 2, it is mandatory that the source of alternating current be accurately adjusted in frequency and voltage and to remain fixed when once adjusted. While it is possible to build an alternating current source of adjustable frequency capable of being adjusted to within very close limits, it is preferable to employ some means whereby the source of alternating current may be accurately and automatically controlled to the proper frequency. It is also desirable to use the plate circuit resistance of a pentode for the high resistance R₂ in Fig. 2. An arrangement capable of providing these features is shown in Fig. 10.

In Fig. 10, the alternating current source O may be any conventional type of oscillator under control of voltage derived from the crystal driving circuit which voltage is fed back over a feedback path. In this figure it will be noted that this control voltage is derived from the drop across resistor 5 in series with the crystal 1. This voltage is fed back to the input circuit of the oscillator in proper phase to maintain oscillations at the oscillating frequency of the crystal whereby the source is automatically and rigidly maintained at the oscillating frequency of the crystal. This is a very important feature to the successful and convenient operation of this type of measuring equipment. While most any type of stable oscillator may be employed, the particular one shown in Fig. 10 to illustrate the invention is preferred. This oscillator comprises an amplifier 7 which may contain a limiter, and a second amplifier 8 which is preferably of the linear amplifier type, these two amplifiers being coupled together through a tuned network 9. The voltage output of this oscillator is read by meter $M_3$. Most of the other circuit features of the crystal driving circuit are substantially identical to those already described for Fig. 2, the coupling capacitors themselves being of the type shown in Fig. 8.

The output voltage from this coupling capacitance network is obtained from across capacitor $C_{10}$. This voltage $e_1$ is applied to the input circuit of a pentode 10 instead of to the high resistance $R_2$ and capacitor $C_p$ as previously shown in Fig. 2. The various bias voltages for the grid circuits of the pentode 10 are not shown in this figure but they are conventional. The plate circuit is supplied from a direct current source 12 through a choke reactor 13. The control grid is connected to the cathode through a grid resistor 11. The voltage source 14 is not a physical circuit element but is schematically disclosed to illustrate the plate circuit voltage generated inside the tube while the resistance $R_2$ represents the plate circuit resistance of the pentode 10. It will thus be noted that the voltage $e_1$ is amplified by the amplification factor of the tube and applied in a series circuit comprising the plate resistance $R_2$ of the tube and the capacitor $C_p$. It will readily be understood that this circuit is substantially like the circuit of Fig. 2 except that the output voltage from the coupling capacitor has been amplified by the amplification factor of the tube and the plate resistance of the tube is employed for the high resistance. The output voltage appearing across the capacitor $C_p$ is measured by the vacuum tube voltmeter $M_2$ just as previously described for Fig. 2.

The circuit of Fig. 10 is set up and operated in substantially the same manner as already described for Fig. 2. The figure of merit may be read by moving switch 6 to the upper terminal labeled M in which case the vacuum tube voltmeter $M_2$ reads the voltage appearing across capacitor $C_{10}$ which is a measure of the figure of merit. The performance index on the other hand is measured by moving the switch 6 to its lower position and measuring the voltage $e_p$ appearing across the capacitor $C_p$.

Fig. 11 discloses another embodiment of the invention based upon the same principle but incorporating a self-calibrating feature designed to calibrate the instrument for the direct reading of the performance index. This particular embodiment is especially arranged for the measurement of the performance index and is not intended for the measurement of the figure of merit. The performance index is of particular importance and is very useful in specifying standard crystals on data sheets in much the same manner as is now done for vacuum tubes. For example, crystals may be specified in terms of their operating frequency, their performance index and the capacitance presented by the oscillator to the crystal.

In Fig. 11 the source of alternating current O comprises an oscillator having a limiting amplifier 7, a linear amplifier 8, an output transformer comprising a primary P and secondary S tuned by a tuning condenser $C_T$ and a feedback path from the crystal driving circuit to the input circuit of the limiting amplifier 7. The feedback voltage is derived from the voltage drop across a capacitor $C_7$ which is in series with the crystal 1. This oscillator also contains an automatic volume control rectifier, amplifier and gain control means 15. Most any type of oscillator containing an automatic volume control and gain control means may be used in place of the particular arrangement shown. The only requirements are that the oscillator shall be of the type capable of being controlled in frequency by the crystal under test and that the voltage output of the oscillator must be under closely regulated automatic control as well as manual control of the output level.

The output voltage $e_0$ of this oscillator is obtained from the secondary of the output transformer and is applied to the crystal driving circuit comprising the crystal 1, the variable capacitor $C_6$ and the fixed capacitor $C_7$ returning to the lower terminal of the transformer secondary S by way of the switch blade 17 of switch SW. The capacitance of the capacitor $C_7$ should be large compared with the capacitance of the capacitor $C_6$. Consequently the capacitance of variable capacitor $C_6$ will be substantially equal to the capacitance $C_2$ previously defined. The vacuum tube voltmeter $M_1$ previously disclosed schematically in Figs. 2 and 10 is here shown as a specific type of well-known diode vacuum tube voltmeter. This circuit is conventional and so well known that it requires no more description. The plate of the diode is connected to the switch blade 16 of switch SW.

The capacitance coupling means in Fig. 11 is somewhat more complex than in Figs. 2 and 10 by reason of the fact that the variable attenuator comprising capacitors $C_{11}$ and $C_{12}$ have been included in the circuit to aid in calibrating the circuit. This attenuator is preferably in the form of a differential variable capacitor and its attenuation may be represented by the factor A. This variable capacitor is shown connected in Fig. 11 with its lower stationary plate to ground and the upper stationary plate to the switch blade 18 of switch SW. The rotor is connected to the grid of the pentode 10. While a pentode has been shown in Fig. 11 as well as in Fig. 10, it should here be stated that a vacuum tube with this particular number of electrodes need not be used as other vacuum tubes with different numbers of electrodes may be substituted.

The circuit of pentode 10 is shown substantially the same as shown in Fig. 10 except for the fact that bias means for the grids have been shown. For example, the normal bias for the control grid is obtained by means of the conventional cathode resistor 22 by-passed by the by-pass capacitor 23. The suppressor grid is connected directly to the cathode. The screen grid is biased from source 12 through a resistor 20 and is by-passed to ground by means of a capacitor 21. The plate is supplied from the direct current source 12 through the choke reactor 13 and plate resistor 19. The control grid is connected to ground through the grid resistor 11. The vacuum tube voltmeter $M_2$ may be of any type having a relatively high input impedance and is coupled to the capacitor $C_p$ through the capacitor 24.

Switch SW is shown to have two positions, one labeled "Test" and the other "Cal." This switch has three blades 16, 17 and 18 which set up the required circuits for testing and calibrating the instrument. To render the circuits set up by these two switch positions more easily understood, reference may be made to Figs. 12 and 13.

In Figs. 12 and 13, the reference characters employed are those shown in Fig. 11 with the exception, however, that the crystal is disclosed in the form shown in Fig. 1B. Also the capacity attenuator A is shown as two separate condensers $C_{11}$ and $C_{12}$ ganged together. This, of course, is an obvious alternative way of making up the capacity attenuator. Instead of showing the vacuum tube 10 as a pentode as shown in Figs. 10 and 11, it is here shown as a triode. As previously stated the theory and operation of the apparatus is not limited to the use of a pentode.

Referring now more particularly to Fig. 12, it will be noted that the circuits are those set up when the switch SW in Fig. 11 is moved to its "Test" position. That these circuits are set up by the switch in this position is obvious and requires no detailed description. The important design considerations with respect to the test circuit portions of Fig. 11 are that the capacitance of $C_7$ shall be large compared to the capacitance of $C_6$ so that the capacitance of $C_6$ substantially equals the capacitance which couples the crystal I to the oscillator. The capacitance of attenuator A is small compared with that of $C_7$ so that although this attentuator may not maintain a constant input capacitance it will not materially effect the adjustment of capacitor $C_6$. This permits the independent adjustment of capacitor $C_6$ to any arbitrary value, as for example, a value equal to the capacitance which will be presented to the crystal by an oscillator in which it may be used. Of course, if the attenuator A is designed to maintain a constant input capacitance, it need not be small compared with the capacitance of $C_7$ although in this case its capacitance must be included with the capacitance of $C_7$ in the design calculations. Another consideration to be kept in mind is that the plate resistance $R_2$ of tube 10 must be large compared with the reactance of capacitor $C_p$. With these considerations in mind and employing the same mathematical analysis previously given for Figs. 3 and 4, it can be shown that $$\frac{X_{L_C}}{R_C} = \frac{e_7 C_7}{e_0 C_6} \quad (15)$$

where:

$X_{L_C}$, $R_C$ are defined in Equation 2.
$e_7$, $e_0$, $C_6$, $C_7$ are as shown in Fig. 12.

The voltage across capacitor $C_p$ may be expressed as $$e_p = X_{C_p} G_M e_2 \quad (16)$$

where $e_p$ and $e_2$ are voltages as shown in Fig. 12.
$X_{C_p}$ is as defined in Equation 11.

$G_M$ is mutual conductance of tube $10 = \frac{\mu}{R_2}$

The attenuator reduces voltage $e_7$ to voltage $e_2$ so that $e_2$ is equal to the attenuator factor A multiplied by the voltage $e_7$ appearing across capacitor $C_7$. The attenuator factor A approximately equals the ratio of the capacitance $C_{11}$ to the sum of the capacitances $C_{11}$ and $C_{12}$. This is expressed as $$e_2 = A e_7 \quad (17)$$

Substituting this value of $e_2$ in Equation 16, solving for $e_7$ and substituting in Equation 15 the following expression is obtained $$\frac{X_{L_C}}{R_C} = \frac{e_p C_7 \omega C_p}{e_0 C_6 G_M A} \quad (18)$$

At resonance the reactance $X_{L_C}$ approximately equals the reactance $X_{C_6}$. Multiplying the left member of Equation 18 by $X_{L_C}$ and the right member by its approximate equivalent $X_{C_6}$ yields the following expression for the performance index $$PI = \frac{X_{L_C}^2}{R_C} = \frac{C_7}{C_6^2 A} \cdot \frac{C_p}{G_M} \cdot \frac{e_p}{e_0} \quad (19)$$

As all of the factors in Equation 19 except voltage $e_p$ are substantially constant for any particular setting of the various adjustable elements of the circuit, it is obvious that the reading of meter $M_2$ will always be proportional to the performance index.

There are actually two fundamental types of operation possible with this apparatus. One type assumes all of the impedances of the circuit to be linear and the meters to read accurately. Under these assumptions the meter $M_2$ may read directly the performance index of the crystal under test. The other type of operation provides an indirect indication of the performance index. In this case it is assumed that the voltmeters may not be accurately calibrated nor is it necessary to know their calibrations since they are caused to always read the same deflection. The performance index is then calculated from the attenuator reading. The exact manner in which this apparatus is used for both the direct and the indirect indication of the performance index may be better understood after a thorough understanding of the calibration procedure which will be described in connection with Fig. 13.

In Fig. 13 the circuits are those set up by the apparatus of Fig. 11 when the switch SW is moved to the "Cal" position. It will be seen that with the switch SW in this position, meter $M_1$ is connected across the large capacitor $C_B$, the voltage drop thereacross being $e_A$ by reason of current supplied from the transformer secondary S through the crystal I and capacitors $C_6$ and $C_7$. This voltage produces a calibrating current $i_A$ through a special calibrating network comprising series-connected capacitor $C_A$ and resistor $R_A$. The reactance of capacitor $C_A$ must be large compared to the resistance $R_A$. The calibrating current $i_A$ produces a voltage $e_7'$ across resistor $R_A$ which voltage is attenuated by the capacity attenuator A as defined by Equation 17, with the attenuator setting during calibration assumed to be equal to A'. The output voltage $e_2'$ of the attenuator is applied to the control grid of tube 10. The rest of the circuit is exactly as previously described. It should be noted that with switch SW in the "Test" position, capacitor $C_B$ and the calibrating networks $C_A$ and $R_A$ are short-circuited by switch blade 17. It should also be noted that the required feedback voltage of proper phase is provided for the oscillator circuit regardless of the position of switch SW because the capacitance of capacitor $C_B$ is very large compared with $C_6$. The actual capacitance value of capacitor $C_B$ is immaterial. It is simply used as a convenient means for producing a voltage source of the crystal operating frequency for use in the calibrating circuit.

From the above-described relationships and relative magnitudes of the various circuit parameters and by employing substantially the same circuit analysis, it can be shown that $$e_p' = \frac{e_2' G_M}{\omega C_p} \quad (20)$$

where $e_p'$, $e_2'$ are voltages obtained during calibration at points shown on Fig. 13.
$G_M$ and $C_p$ are as previously defined.

During calibration the voltage input of the calibrating circuit will be $e_7'$ which is equal to $$\frac{e_2'}{A'}$$

as will be apparent from Equation 17. This voltage $e_7'$ is also equal to the voltage drop across resistor $R_A$ which drop can be shown to be approximately equal to $$\omega C_A e_A R_A$$

From these considerations the following expression is derived $$\frac{e_2'}{\omega} = C_A R_A A' e_A \qquad (21)$$

In this equation it should be remembered that the quantity $A'$ is the factor read from the attenuator dial during calibration while the voltages are the voltages at the respective points indicated on Fig. 13 during calibration.

Making the substitution from Equation 21 into Equation 20 and solving for the ratio $$\frac{C_p}{G_M}$$

and substituting this quantity in Equation 19 will yield $$PI = \frac{KA'}{C_{6A}^2} \frac{(e_p)}{e_p'} \frac{(e_A)}{(e_0)} \qquad (22)$$

where $$K = C_A R_A C_7$$

In the practical use of the apparatus the constant $K$ is made equal to some multiple of ten by properly selecting the capacitors $C_A$ and $C_7$ and the resistor $R_A$. The two modes of operation of which this apparatus is capable may now be more easily understood.

Assuming the voltmeters are accurately calibrated, it is possible to make the apparatus of this invention read the performance index PI directly by calibrating the PI meter in the following manner. It is assumed the measurements are to be made of a number of crystals with a particular oscillator in view. The capacitance presented by the oscillator and the voltage required to appear across the crystal when in that oscillator are determined. The variable capacitor $C_6$ of the test circuit is adjusted to equal the capacitance presented by the oscillator. With switch SW on the "Test" position and the crystal connected to the test terminals, the tuning condenser $C_T$ is adjusted until meter $M_2$ reads maximum. This merely adjusts the tuned circuit T to the operating frequency of the crystal to be tested. Determine the value of the voltage $e_0$ on the meter $M_1$ by adjusting the test oscillator gain until meter $M_3$ across the crystal reads the voltage $e_c$, the required crystal oscillating voltage. It should be remembered that this voltage $e_c$ is approximately the same voltage which appeared across the crystal when it was in the commercial oscillator for which these measurements are being made. The meter $M_3$ should then be removed from the circuit. This attenuator dial should be set to unity, that is, the factor $A'$ is made equal to 1. With the switch SW on the calibrate position "Cal" temporarily adjust the gain control of the test oscillator until meter $M_1$ reads a voltage $e_A$ such that the ratio of voltages $e_A$ to $e_0$ equals unity or some multiple of ten. Then with the switch SW still on the calibrate position, adjust the capacitance of capacitor $C_p$ in the output circuit of tube 10 until the meter $M_2$ reads some convenient multiple of ten from about one-fourth to one-half full scale. This is the voltage $e_p'$. With switch SW moved to the "Test" position readjust the test oscillator gain until meter $M_1$ again reads voltage $e_0$ as determined when the gain control was first adjusted with the meter $M_3$ across the crystal. The voltage across the crystal will thereby be made substantially equal to the voltage $e_c$ as was read by meter $M_3$ when it was in the circuit during the first gain adjustment.

With the adjustments made in the preceding paragraph it will be noted that all of the factors appearing in Equation 22 are known or otherwise determined by the calibration except the voltage $e_p$ which is the reading of the meter $M_2$. As these factors have all been arbitrarily chosen so that they are equal to unity or some multiple of ten it is obvious that the reading of the meter $M_2$ will be numerically equal to the performance index PI of the crystal under test or it will be equal to some multiple of ten thereof. The multiplying factor is easily obtained by evaluating the various constants. Any other crystal intended for use in the same oscillator circuit may be substituted for the first crystal and meter $M_2$ will directly indicate its performance index. Also, any slight frequency difference due to slight differences in the crystals is automatically corrected by reason of having the frequency of source O under control of the crystal under test.

If the performance index of a number of crystals is to be determined without regard to any particular oscillator, the variable capacitor $C_6$ may be adjusted to any arbitrary value convenient in evaluating the constants to be used in the Equation 22. Due to the non-linear amplitude-frequency characteristic of some crystals and non-linear amplitude PI characteristic of others, the voltage level at which the tests are made should be specified. The crystals may then be tested in substantially the manner previously described except that the values of performance index obtained are relative values comparing the crystals with each other.

To employ the second mode of operation, it is immaterial whether the meters read accurately the actual voltage applied to their terminals. It is only necessary that the instruments consistently read the same indication for the same amount of voltage. The variable capacitor $C_6$ is adjusted to equal the capacitance of the oscillators in which the crystals are to be used. With the switch SW on its test position, capacitor $C_p$ is adjusted to tune circuit T in the manner previously described. Voltage $e_0$ as read by meter $M_1$ is determined by adjusting the gain control means 15 until meter $M_3$ reads the voltage $e_c$ which, as before, is the voltage appearing across the crystal in the oscillator in which the crystals are to be used. Meter $M_3$ is then removed from the circuit. The attenuator A should be adjusted to unity so that $A'$ is equal to 1. So far the adjustments are just the same as for setting up the apparatus for direct reading. With the switch SW on the calibrate position "Cal" the gain control 15 should be adjusted until the meter $M_1$ reads a voltage $e_A$ equal to the voltage $E_0$. This makes the ratio $e_A$ to $e_0$ equal to unity. Then with the switch SW still on the calibrate position adjust the capacitor $C_p$ until the meter $M_2$ reads any convenient value from about one half to full scale deflection. This is the voltage $e_p'$. The actual value of this voltage is immaterial and may simply be represented by an arbitrary index mark on the meter scale. The switch SW should then be moved to its "Test" position and the gain of the oscillator readjusted until the meter $M_1$ again reads the voltage $e_0$. As previously explained this brings the voltage across the crystal substantially equal to the value $e_0$ as previously determined by the use of the meter $M_3$. The attenuator A should then be adjusted until the meter $M_2$ reads the same as it did during calibration, that is until voltage $e_p$ is equal to the voltage $e_p'$. The attenuator setting A should then be observed and the performance index may be calculated from the following expression $$PI = \frac{K}{AC_s^2} \qquad (23)$$

That Equation 23 correctly defines the performance index may be readily observed by referring to Equation 22 and the calibrating procedure which has just been outlined for the indirect mode of operation. It will be remembered that in the calibrating procedure, the attenuator setting A' during calibration was made equal to unity. Also the reading of meter $M_2$ was made the same during calibration as during the measurement so that $e_p$ was made equal to $e_p'$ and consequently this ratio is made unity. It will also be remembered that during the calibration the voltage $e_A$ was made equal to $e_0$ so that this ratio also was made equal to unity. Hence Equation 23 will correctly define the performance index of the crystal to be measured. Due to the fact that this method of operation rules out inaccuracies in meter calibration, it is the most accurate of the two methods. If a plurality of crystals of the same kind are to be measured, they may ordinarily be measured by simply substituting them in the test circuit at terminal 23 for the ones used during calibration. It will then be noted that the performance index of the various crystals will vary inversely with the setting of the capacitance attenuator A. Where better accuracy is required, the instrument should be recalibrated anew for each crystal to be tested.

Having described the invention in considerable particularity with respect to the specific embodiments, it should be understood that the invention is not limited to the specific circuits disclosed for illustrative purposes. The invention may be practiced by any circuit means which provides an alternating current driving source of stabilized output voltage, the frequency whereof is preferably under control of the crystal under test and which source is coupled to the crystal through a capacity means. The voltage across this capacity means may be measured by any convenient high impedance voltage measuring means to yield the quality factor herein defined as the figure of merit. This voltage may also be applied directly or through any suitable coupling means to a high resistance in series with a second capacity means. The voltage across this second capacity means is a measure of the quality factor herein defined as the performance index.

The figure of merit M finds its greatest value in comparing the quality of crystals without regard to any particular oscillating circuit of which the crystals may be made a part. This is because the factors defining the figure of merit include only the inherent shunt capacitance, the inherent resistance of the crystal and the frequency at which the test is made, thereby not taking into account the effect of any external impedances which are important when the crystal is connected to them as for example, an oscillator circuit.

The performance index PI finds its greatest utility as design data. For example, standard crystals may be measured for performance index over a specified range of crystal voltage and external shunt capacitance. Data sheets may then be prepared for them in much the same manner as is customarily done for vacuum tubes. In addition to the frequency, the designer ordinarily need only specify the minimum performance index required by the oscillator he is designing and the value of the capacitance which the oscillator will present to the crystal. Any crystal having a performance index greater than the specified minimum will operate properly in the oscillator. This will be recognized as a distinct advantage over existing methods of specifying crystals wherein a sample oscillator is either provided by the purchaser or reference is made by the purchaser to some oscillator which he knows the crystal manufacturer to have in his possession for test purposes. Such procedures require the crystal manufacturer to have in his possession a large number of oscillator circuits, one for each type of oscillator for which he is making crystals. This undesirable condition is entirely overcome by the present invention.

Occasionally some crystal units will exhibit a particularly low quality due primarily to the fact that the mounting adds sufficient shunt leakage resistance to the complete crystal unit to lower the performance index considerably below that which may be calculated from Equation 2. It should be noted that Equation 2 applies to the crystal per se and does not take into account any shunt resistance whether existing within the crystal itself or added by its mounting. However, it can be shown that the apparatus of this invention correctly measures the actual performance index and actually does take into account the effect of this shunt resistance. The performance index actually measured $(PI)_a$ may be expressed in terms of the calculated performance index $(PI)$ and the added shunt resistance $R_s$ as follows:

$$(PI)_a = \frac{(PI) R_s}{(PI) + R_s} \qquad (24)$$

What is claimed is:

1. A circuit for measuring quality factors of a piezoelectric crystal comprising a crystal to be tested, a source of alternating electric energy, a crystal driving circuit comprising a capacity means coupling the crystal to the source, a frequency determining means in said source coupled to the driving circuit whereby the frequency of said source is controlled to equal the resonant frequency of the crystal and said coupling capacity means, a resistance means and second capacity means connected in series and coupled to the crystal driving circuit so as to have impressed on said series circuit a voltage substantially proportional to the voltage appearing across the first capacity means, said resistance means having a resistance large compared to the reactance of the second capacity means at the frequency of the source of energy, a voltage measuring means, and a switch for selectively connecting the voltage measuring means either across a portion of the crystal driving circuit whereby one quality factor is measured or across the second capacity means whereby a different quality factor is measured.

2. A circuit for measuring quality factors of a piezoelectric crystal comprising a crystal to be tested, a source of alternating electric energy, a crystal driving circuit including a capacity means coupling the crystal to the source, a frequency determining means in said source coupled to the driving circuit whereby the frequency of said source is controlled to equal the resonant frequency of the crystal and said coupling capacity means, a resistance means and second capacity means connected in series and across at least a part of the first-named capacity means, said resistance means having a resistance large compared to the reactance of the second capacity means at the frequency of the source of energy, a voltage measuring means, and a switch for selectively connecting the voltage measuring means either across at least part of the first capacity means whereby one quality factor is measured or across the second capacity means whereby a different quality factor is measured.

3. A circuit for measuring quality factors of a piezoelectric crystal comprising a crystal to be tested, a source of alternating electric energy, a crystal driving circuit including a capacity means coupling the crystal to the source, a frequency determining means in said source coupled to the driving circuit whereby the frequency of said source is controlled to equal the resonant frequency of the crystal and said coupling capacity means, a resistance means and a second capacity means connected in series and coupled to a circuit including at least a part of the first-named capacity means, said resistance means having a resistance large compared to the reactance of the second capacity means at the frequency of the source of energy, a voltage measuring means, and a switch for selectively connecting the voltage measuring means either across at least a part of the first capacity means whereby one quality factor is measured or across the second capacity means whereby a different quality factor is measured.

4. A circuit for measuring the figure of merit of a piezoelectric crystal at a predetermined crystal operating frequency comprising a crystal to be tested, a source of alternating electric energy, a crystal driving circuit including a capacity means coupling the crystal to the source, a frequency determining means in said source coupled to the driving circuit whereby the frequency of said source is controlled to equal the resonant frequency of the crystal and said coupling capacity means, a voltage measuring means coupled to at least part of the capacity means whereby the readings of said voltage measuring means are a measure of the figure of merit of the crystal at the controlled operating frequency.

5. A circuit for measuring the figure of merit of a piezoelectric crystal at a predetermined crystal operating frequency comprising a crystal to be tested, said crystal having a shunt capacitance parameter of predetermined magnitude, a source of alternating electric energy, a crystal driving circuit coupling the crystal to the source and including a variable capacity means the capacitance whereof is adjusted substantially equal to the said shunt capacitance parameter of the crystal, a frequency determining means in said source coupled to the driving circuit whereby the frequency of said source is controlled to equal the resonant frequency of the crystal and said coupling capacity means, a voltage measuring means coupled to at least part of the capacity means whereby the readings of said voltage measuring means are a measure of the figure of merit of the crystal at the controlled operating frequency.

6. A circuit for measuring the figure of merit of a piezoelectric crystal at a predetermined crystal operating frequency comprising a crystal to be tested, said crystal having a shunt capacitance parameter of predetermined magnitude, a source of alternating electric energy, a crystal driving circuit coupling the crystal to the source and including a variable capacity means the capacitance whereof is adjusted to an arbitrary value relative to the said shunt capacitance parameter of the crystal, a frequency determining means in said source coupled to the driving circuit whereby the frequency of said source is controlled to equal the resonant frequency of the crystal and said coupling capacity means, a voltage measuring means coupled to at least part of the capacity means whereby the readings of said voltage measuring means are a measure of the figure of merit of the crystal at the controlled operating frequency.

7. A circuit for measuring the performance index of a piezoelectric crystal comprising a crystal to be tested, a source of alternating electric energy, a crystal driving circuit comprising a capacity means coupling the crystal to the source, a frequency determining means in said source coupled to the driving circuit whereby the frequency of said source is controlled to equal the resonant frequency of the crystal and said coupling capacity means, a resistance means and second capacity means connected in series and coupled to the crystal driving circuit so as to have impressed on said series circuit a voltage substantially proportional to the voltage appearing across the first capacity means, said resistance means having a resistance large compared to the reactance of the second capacity means at the frequency of the source of energy, and a voltage measuring means connected across the second capacity means whereby the readings thereof will be a measure of the performance index of the crystal at the controlled crystal operating frequency.

8. A circuit for measuring the performance index of a piezoelectric crystal comprising a crystal to be tested, a source of alternating electric energy, a crystal driving circuit including a capacity means coupling the crystal to the source, a frequency determining means in said source coupled to the driving circuit whereby the frequency of said source is controlled to equal the resonant frequency of the crystal and said coupling capacity means, a resistance means and second capacity means connected in series and across at least a part of the first-named capacity means, said resistance means having a resistance large compared to the reactance of the second capacity means at the frequency of the source of energy, a voltage measuring means connected across the second capacity means whereby the readings thereof will be a measure of the performance index of the crystal at the predetermined crystal operating frequency.

9. A circuit for measuring the performance index of a piezoelectric crystal comprising a crystal to be tested, a source of alternating electric energy, a crystal driving circuit comprising a variable capacity means coupling the crystal to the source, a frequency determining means in said source coupled to the driving circuit whereby the frequency of said source is controlled to equal the resonant frequency of the crystal and said coupling capacity means, a resistance means and second capacity means connected in series and coupled to the crystal driving circuit so as to have impressed on said series circuit a voltage substantially proportional to the voltage appearing across the first capacity means, said resistance means having a resistance large compared to the reactance of the second capacity means at the frequency of the source of energy, and a voltage measuring means connected across the second capacity means whereby the readings thereof will be a measure of the performance index of the crystal at the predetermined crystal operating frequency.

10. A circuit for measuring the performance index of a piezoelectric crystal comprising a crystal to be tested, a source of alternating electric energy, a crystal driving circuit including a variable capacity means coupling the crystal to the source, a frequency determining means in said source coupled to the driving circuit whereby the frequency of said source is controlled to equal the resonant frequency of the crystal and said coupling capacity means, a resistance means and second capacity means connected in series and across at least a part of the first-named capacity means, said resistance means having a resistance large compared to the reactance of the second capacity means at the frequency of the source of energy, a voltage measuring means connected across the second capacity means whereby the readings thereof will be a measure of the performance index of the crystal at the predetermined crystal operating frequency.

11. A circuit for measuring the performance index of a piezoelectric crystal comprising a crystal to be tested, a source of alternating electric energy, a crystal driving circuit comprising a capacity means coupling the crystal to the source, a frequency determining means in said source coupled to the driving circuit whereby the frequency of said source is controlled to equal the resonant frequency of the crystal and said coupling capacity means, said capacity means comprising a variable capacity means connected in circuit with a capacity means of capacitance large compared with that of the variable capacity means, a resistance means and second capacity means connected in series and coupled to said large capacity means in the driving circuit so as to have impressed on said series circuit a voltage substantially proportional to the voltage appearing across the first capacity means, said resistance means having a resistance large compared to the reactance of the second capacity means at the frequency of the source of energy, and a voltage measuring means connected across the second capacity means whereby the readings thereof will be a measure of the performance index of the crystal at the predetermined crystal operating frequency.

12. A circuit for measuring the performance index of a piezoelectric crystal comprising a crystal to be tested, a source of alternating electric energy, a crystal driving circuit comprising a capacity means coupling the crystal to the source, a frequency determining means in said source coupled to the driving circuit whereby the frequency of said source is controlled to equal the resonant frequency of the crystal and said coupling capacity means, a resistance means and second capacity means, said resistance means comprising an electron discharge device having an inherent space path resistance, an input circuit for said discharge device coupled to the driving circuit capacity means so as to have impressed on the input circuit a voltage substantially proportional to the voltage appearing across the first capacity means, an output circuit for the electron discharge device including the inherent space path resistance in series with said second capacity means, said space path resistance being large compared with the reactance of said second capacity means at the frequency of the source of energy, and a voltage measuring means connected across the second capacity means whereby the readings thereof will be a measure of the performance index of the crystal at the predetermined crystal operating frequency.

13. A self-calibrating circuit for measuring the performance index of a piezoelectric crystal comprising a crystal to be tested, a source of alternating current, a capacity means coupling the crystal to the source of electric current, a frequency determining means in said source coupled to the crystal whereby the frequency of said source is controlled to equal the resonant frequency of the crystal and said coupling capacity means, a resistance means and second capacity means connected in series and coupled to a circuit including at least a part of the first-named capacity means, said resistance means having a resistance large compared to the reactance of the second capacity means at the frequency of the source of energy, a voltage measuring means connected to the second capacity means responsive to the voltage appearing thereacross which voltage is a measure of the performance index of the crystal, a calibrating circuit therefor comprising a calibrating capacity means and a calibrating resistance means connected in series, switching means for temporarily coupling said calibrating circuit to said source of alternating current and for coupling said series-connected resistance means and second capacity means to said calibrating resistance means.

14. A self-calibrating circuit for measuring the performance index of a piezoelectric crystal comprising a crystal to be tested, a source of alternating current, a capacity means coupling the crystal to the source of electric current, a frequency determining means in said source coupled to the crystal whereby the frequency of said source is controlled to equal the resonant frequency of the crystal and said coupling capacity means, a resistance means and a second capacity means connected in series and coupled to a circuit including at least a part of the first-named capacity means, said resistance means having a resistance large compared to the reactance of the second capacity means at the frequency of the source of energy, a voltage measuring means connected to the second capacity means responsive to the voltage appearing thereacross which voltage is a measure of the performance index of the crystal, a calibrating circuit therefor comprising a calibrating capacitor and a calibrating resistor connected in series, switching means for temporarily coupling said calibrating circuit to said source of alternating current and for coupling said series-connected resistance means and second capacity means to said calibrating resistor.

15. A self-calibrating circuit for measuring the performance index of a piezoelectric crystal comprising a crystal to be tested, a source of alternating current, a capacity means coupling the crystal to the source of electric current, a frequency determining means in said source coupled to the crystal whereby the frequency of said source is controlled to equal the resonant frequency of the crystal and said coupling capacity means, a resistance means and second capacity means connected in series and coupled to a circuit including at least a part of the first-named capacity means, said resistance means having a resistance large compared to the reactance of the second capacity means at the frequency of the source of energy, a voltage measuring means connected to the second capacity means responsive to the voltage appearing thereacross which voltage is a measure of the performance index of the crystal, a calibrating circuit therefor comprising a calibrating capacitor and a calibrating resistor and means connecting them in series, switching means for temporarily coupling said calibrating circuit to said source of alternating current and for coupling said series-connected resistance means and second capacity means to said calibrating resistor.

16. A self-calibrating circuit for measuring the performance index of a piezoelectric crystal comprising a crystal to be tested, a source of alternating current, a capacity means coupling the crystal to the source of electric current, a frequency determining means in said source coupled to the crystal whereby the frequency of said source is controlled to equal the resonant frequency of the crystal and said coupling capacity means, a resistance means and second capacity means connected in series and coupled to a circuit including at least a part of the first-named capacity means, said resistance means having a resistance large compared to the reactance of the second capacity means at the frequency of the source of energy, a voltage measuring means connected to the second capacity means responsive to the voltage appearing thereacross which voltage is a measure of the performance index of the crystal, a calibrating circuit therefor comprising a calibrating capacity means and a calibrating resistance means connected in series, a second voltage measuring means normally connected across said source of alternating current, switching means for temporarily coupling said calibrating circuit to said source of alternating current, said second voltage measuring means across said calibrating circuit and for coupling said series-connected resistance means and second capacity means to said calibrating resistance means.

17. A self-calibrating circuit for measuring the performance index of a piezoelectric crystal comprising a crystal to be tested, a source of alternating current, a capacity means coupling the crystal to the source of electric current, a frequency determining means in said source coupled to the crystal whereby the frequency of said source is controlled to equal the resonant frequency of the crystal and said coupling capacity means, a resistance means and second capacity means connected in series and coupled to a circuit including at least a part of the first-named capacity means, said resistance means having a resistance large compared to the reactance of the second capacity means at the frequency of the source of energy, a voltage measuring means connected to the second capacity means responsive to the voltage appearing thereacross which voltage is a measure of the performance index of the crystal, a calibrating circuit therefor comprising a calibrating capacitor and a calibrating resistor connected in series, a second voltage measuring means normally connected across said source of alternating current, switching means for temporarily coupling said calibrating circuit to said source of alternating current, said second voltage measuring means across said calibrating circuit and for coupling said series-connected resistance means and second capacity means to said calibrating resistor.

18. A self-calibrating circuit for measuring the performance index of a piezoelectric crystal comprising a crystal to be tested, a source of alternating current, a capacity means coupling the crystal to the source of electric current, a frequency determining means in said source coupled to the crystal whereby the frequency of said source is controlled to equal the resonant frequency of the crystal and said coupling capacity means, a resistance means and second capacity means connected in series and coupled to a circuit including at least a part of the first-named capacity means, said resistance means having a resistance large compared to the reactance of the second capacity means at the frequency of the source of energy, a voltage measuring means connected to the second capacity means responsive to the voltage appearing thereacross which voltage is a measure of the performance index of the crystal, a calibrating circuit therefor comprising a calibrating capacitor and a calibrating resistor and means connecting them in series, a second voltage measuring means normally connected across said source of alternating current, switching means for temporarily coupling said calibrating circuit to said source of alternating current, said second voltage measuring means across said calibrating circuit and for coupling said series-connected resistance means and second capacity means to said calibrating resistor.

19. The combination in accordance with claim 13 wherein the reactance of the calibrating capacity means is large compared with the resistance of the calibrating resistance means.

20. The combination in accordance with claim 14 wherein the reactance of the calibrating capacitor is large compared with the resistance of the calibrating resistor.

21. The combination in accordance with claim 15 wherein the reactance of the calibrating capacitor is large compared with the resistance of the calibrating resistor.

IRVIN E. FAIR.

REFERENCES CITED

The following references are of record in the file of this patent:

UNITED STATES PATENTS

| Number | Name | Date |
| --- | --- | --- |
| 2,137,787 | Snow | Nov. 22, 1938 |
| 2,337,759 | Loughlin | Dec. 28, 1943 |

OTHER REFERENCES

Mason et al., Bell Telephone System Monograph B-1363 (Pub. in Proceedings of the Institute of Radio Engineers, Oct. 1942), pages 3 to 8.

Electronic Engineering, April 1943, pp. 452–456.